United States Patent
Matsuu

(10) Patent No.: US 10,998,542 B2
(45) Date of Patent: May 4, 2021

(54) POSITIVE ELECTRODE ACTIVE MATERIAL, POSITIVE ELECTRODE, AND LITHIUM ION SECONDARY BATTERY

(71) Applicant: Envision AESC Energy Devices Ltd., Sagamihara (JP)

(72) Inventor: Masaaki Matsuu, Sagamihara (JP)

(73) Assignee: Envision AESC Energy Devices Ltd., Sagamihara (JP)

( * ) Notice: Subject to any disclaimer, the term of this patent is extended or adjusted under 35 U.S.C. 154(b) by 2 days.

(21) Appl. No.: 16/474,299

(22) PCT Filed: Dec. 26, 2017

(86) PCT No.: PCT/JP2017/046657
§ 371 (c)(1),
(2) Date: Jun. 27, 2019

(87) PCT Pub. No.: WO2018/135253
PCT Pub. Date: Jul. 26, 2018

(65) Prior Publication Data
US 2019/0341600 A1    Nov. 7, 2019

(30) Foreign Application Priority Data

Jan. 20, 2017  (JP) .............................. JP2017-008123

(51) Int. Cl.
H01M 4/131  (2010.01)
H01M 4/36  (2006.01)
(Continued)

(52) U.S. Cl.
CPC .......... H01M 4/131 (2013.01); H01M 4/364 (2013.01); H01M 4/505 (2013.01); H01M 4/525 (2013.01);
(Continued)

(58) Field of Classification Search
None
See application file for complete search history.

(56) References Cited

U.S. PATENT DOCUMENTS

| | | | | |
|---|---|---|---|---|
| 7,241,532 B2 * | 7/2007 | Kikuchi | ................ | H01M 4/131 |
| | | | | 423/277 |
| 2012/0164533 A1 * | 6/2012 | Senoue | ................ | H01M 4/485 |
| | | | | 429/219 |
| 2015/0380736 A1 * | 12/2015 | Park | ....................... | H01M 4/485 |
| | | | | 252/182.1 |

FOREIGN PATENT DOCUMENTS

| | | |
|---|---|---|
| CN | 102339981 A | 2/2012 |
| JP | 2000-030693 A | 1/2000 |
| | (Continued) | |

OTHER PUBLICATIONS

International Search Report of PCT/JP2017/046657 dated Mar. 20, 2018 [PCT/ISA/210].

(Continued)

*Primary Examiner* — Daniel S Gatewood
(74) *Attorney, Agent, or Firm* — Sughrue Mion, PLLC

(57) ABSTRACT

A positive electrode active material according to the present invention is a positive electrode active material that is used in a positive electrode for a lithium ion secondary battery. This positive electrode active material includes positive electrode active material particles A represented by Formula (A): $Li_\alpha Ni_x Co_y M^1_{(1-x-y)} O_2$ (where $0<\alpha \leq 1.15$, $0.90<x\leq 0.98$, $0<y\leq 0.10$, and $0<(1-x-y)$), and positive electrode active material particles B represented by Formula (B): $Li_\beta Ni_a Co_b M^2_{(1-a-b)} O_2$ (where $0<\beta \leq 1.15$, $0.70 \leq a \leq 0.90$, $0<b\leq 0.20$, and $0<(1-a-b)$). $M^1$ and $M^2$ each independently represent one element or two or more elements selected from the group consisting of Li, B, Mg, Al, Fe, and Mn.

4 Claims, 2 Drawing Sheets

(51) Int. Cl.
  *H01M 4/505*    (2010.01)
  *H01M 4/525*    (2010.01)
  *H01M 10/0525*  (2010.01)
  *H01M 4/02*     (2006.01)

(52) U.S. Cl.
  CPC .. *H01M 10/0525* (2013.01); *H01M 2004/028* (2013.01)

(56) References Cited

FOREIGN PATENT DOCUMENTS

| | | |
|---|---|---|
| JP | 2002-319398 A | 10/2002 |
| JP | 2002-319435 A | 10/2002 |
| JP | 2011-146132 A | 7/2011 |
| JP | 2014-528891 A | 10/2014 |
| JP | 2016-100064 A | 5/2016 |
| JP | 2016-127004 A | 7/2016 |
| JP | 2016-178051 A | 10/2016 |
| JP | 2017-154915 A | 9/2017 |
| KR | 10-1568263 B1 | 11/2015 |
| WO | 2014/156011 A1 | 10/2014 |
| WO | 2016/136226 A1 | 9/2016 |

OTHER PUBLICATIONS

Communication dated Jul. 16, 2020, from the European Patent Office in European Application No. 17892542.6.

* cited by examiner

POSITIVE ELECTRODE ACTIVE MATERIAL, POSITIVE ELECTRODE, AND LITHIUM ION SECONDARY BATTERY

CROSS REFERENCE TO RELATED APPLICATIONS

This application is a National Stage of International Application No. PCT/JP2017/046657, filed Dec. 26, 2017, claiming priority to Japanese Patent Application No. 2017-008123, filed Jan. 20, 2017, the contents of all of which are incorporated herein by reference in their entirety.

TECHNICAL FIELD

The present invention relates to a positive electrode active material, a positive electrode, and a lithium ion secondary battery.

BACKGROUND ART

The lithium ion secondary battery has high energy density and superior charging and discharging cycle characteristics, and thus is widely used as a power source for a small mobile device such as a mobile phone or a laptop computer.

In addition, recently, in accordance with consideration of an environmental problem and rising awareness of energy saving, demands for large-sized batteries that require high capacity and long lifetime have also increased in the fields of electric vehicles, hybrid electric vehicles, and electric power storage.

In general, the lithium ion secondary battery mainly includes: a negative electrode that includes a carbon material capable of storing and releasing lithium ions as a negative electrode active material; a positive electrode that includes a lithium composite oxide capable of storing and releasing lithium ions as a positive electrode active material; a separator that separates the negative electrode and the positive electrode from each other; and a nonaqueous electrolytic solution in which a lithium salt is dissolved in a nonaqueous solvent.

As an exterior material of the lithium ion secondary battery, a metal thin film that can be reduced in weight and thickness and can adopt a free shape as compared to a metal can or a laminate film in which the metal thin film and a heat-fusible resin film are laminated is also used instead of a metal can.

In order to increase the capacity and the lifetime and to improve mass production stability, further improvement of characteristics of the lithium ion secondary battery is required.

Examples of countermeasures for increasing the capacity of the lithium ion secondary battery include methods described in Patent Document 1 and Patent Document 2.

Patent Document 1 describes a positive electrode active material formed of a nickel composite oxide in which a part of nickel in lithium nickel oxide is substituted with a transition metal.

In addition, Patent Document 2 describes a technique of mixing a lithium nickel composite oxide into which a heteroelement is introduced with a lithium cobalt composite oxide into which a heteroelement is introduced for use.

In particular, recently, in order to increase the capacity of the lithium ion secondary battery, the application of a lithium nickel oxide in which the abundance ratio of nickel is high has been considered.

RELATED DOCUMENT

Patent Document

[Patent Document 1] Japanese Laid-open Patent Publication NO. 2000-030693
[Patent Document 2] Japanese Laid-open Patent Publication NO. 2002-319398

SUMMARY OF THE INVENTION

Technical Problem

However, the lithium nickel composite oxide in which the abundance ratio of nickel is high tends to have poorer lifetime characteristics than other positive electrode active materials that have been put into practice. This problem inhibits the practical use of a lithium nickel composite oxide in a lithium ion secondary battery.

Therefore, it is required to improve lifetime characteristics while increasing the capacity of a lithium ion secondary battery.

The present invention has been made in consideration of the above-described circumstances, and an object thereof is to provide: a positive electrode active material with which a lithium ion secondary battery having a sufficient energy density and improved lifetime characteristics can be realized; and a lithium ion secondary battery having a sufficient energy density and improved lifetime characteristics.

Solution to Problem

According to the present invention,
there is provided a positive electrode active material that is used for a positive electrode for a lithium ion secondary battery, the positive electrode active material including
positive electrode active material particles A represented by Formula (A): $Li_\alpha Ni_x Co_y M^1_{(1-x-y)} O_2$ (where $0 < \alpha \le 1.15$, $0.90 < x \le 0.98$, $0 < y \le 0.10$, and $0 < (1-x-y)$), and
positive electrode active material particles B represented by Formula (B): $Li_\beta Ni_a CO_b M^2_{(1-a-b)} O_2$ (where $0 < \beta \le 1.15$, $0.70 \le a \le 0.90$, $0 < b \le 0.20$, and $0 < (1-a-b)$),
in which $M^1$ and $M^2$ each independently represent one element or two or more elements selected from the group consisting of Li, B, Mg, Al, Fe, and Mn.

In addition, according to the present invention,
there is provided a positive electrode including a positive electrode active material layer that includes the above-described positive electrode active material, a binder, and a conductive assistant.

In addition, according to the present invention,
there is provided a lithium ion secondary battery including at least: a negative electrode capable of storing or releasing lithium; an electrolytic solution; and the above-described positive electrode.

Advantageous Effects of Invention

According to the present invention, it is possible to provide: a positive electrode active material with which a lithium ion secondary battery having a sufficient energy density and improved lifetime characteristics can be realized; and a lithium ion secondary battery having a sufficient energy density and improved lifetime characteristics

BRIEF DESCRIPTION OF THE DRAWINGS

The object and other objects, characteristics, and advantageous effects will be clarified by the following preferred embodiment and the accompanying drawings.

DESCRIPTION OF EMBODIMENTS

Figure 1:
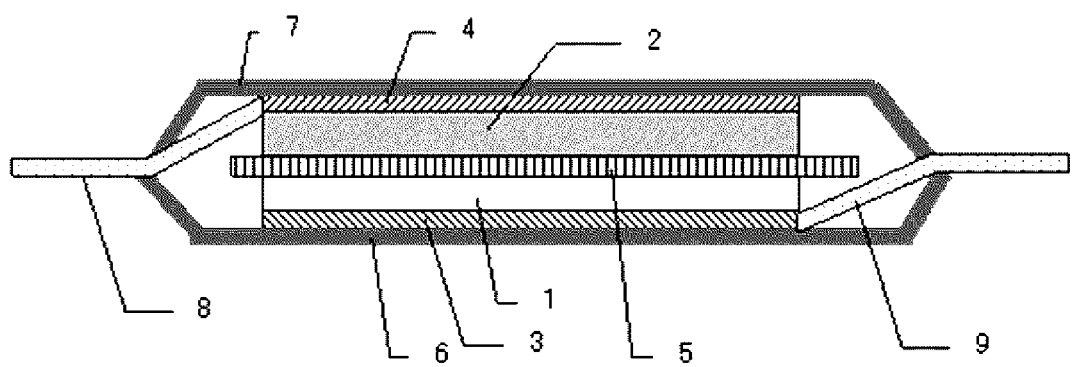
FIG. 1 is a cross-sectional view showing an example of a structure of a lithium ion secondary battery according to an embodiment of the present invention.

Hereinafter, an embodiment of the present invention will be described using the drawings. In the drawings, the shapes, the sizes, and the disposition relationships of the respective components are schematically shown for easy understand of the present invention and are different from the actual ones. In addition, unless specified otherwise, "to" in numerical value ranges indicates a range of equal to or more than a number and equal to or less than the other number.

<Positive Electrode Active Material>

A positive electrode active material according to the embodiment is used for a positive electrode for a lithium ion secondary battery, the positive electrode active material including positive electrode active material particles A represented by Formula (A): $Li_\alpha Ni_x Co_y M^1_{(1-x-y)} O_2$ (where $0<\alpha\leq1.15$, $0.90<x\leq0.98$, $0<y\leq0.10$, and $0<(1-x-y)$), and positive electrode active material particles B represented by Formula (B): $Li_\beta Ni_a Co_b M^2_{(1-a-b)} O_2$ (where $0<\beta\leq1.15$, $0.70\leq a\leq0.90$, $0<b\leq0.20$, and $0<(1-a-b)$).

Here, $M^1$ and $M^2$ each independently represent one element or two or more elements selected from the group consisting of Li, B, Mg, Al, Fe, and Mn.

Here, it is preferable that the positive electrode active material particles A and the positive electrode active material particles B have, for example, a lamellar crystal structure.

With the positive electrode active material according to the embodiment, a lithium ion secondary battery having a sufficient energy density and improved lifetime characteristics can be realized.

The reason why the lithium ion secondary battery can be realized is not necessarily unclear but is presumed to be as follows.

In particular, a nickel composite oxide having a lamellar crystal structure in which a Ni ratio exceeds 90% has a higher charge and discharge capacity than other positive electrode active materials that have been put into practice. However, particle cracking may occur due to expansion and contraction of particles during charge and discharge cycle. The occurrence of the particle cracking is accelerated due to an uneven intralayer reaction described below such that a conductive path is disconnected, and a phenomenon in which the capacity rapidly decreases after charge and discharge cycle occurs.

In addition, in a case where a current is caused to flow to charge and discharge the lithium ion secondary battery, resistance polarization in a thickness direction occurs in a positive electrode active material layer. Therefore, a charge and discharge reaction occurs preferentially from positive electrode active material particles present around a surface of the positive electrode active material layer facing a negative electrode, and subsequently a charge and discharge reaction occurs from positive electrode active material particles present around a positive electrode current collector side. In a case where a higher current than that of the related art flows due to an increase in the capacity or output of a lithium ion secondary battery, resistance polarization in the thickness direction in a positive electrode active material layer increases, and thus an uneven intralayer charge and discharge reaction phenomenon occurs in which a charge and discharge reaction occurs only in positive electrode active material particles present around a surface of the positive electrode active material layer facing a negative electrode.

In a case where the cycle of the uneven intralayer charge and discharge reaction is repeated, a charge and discharge reaction occurs only in positive electrode active material particles present around a surface of the positive electrode active material layer facing a negative electrode. Therefore, even in a case where the number of times of repetition is small, the capacity of the positive electrode active material particles present around the surface of the positive electrode active material layer facing the negative electrode is likely to decrease. In a case where the capacity of the positive electrode active material particles decreases, a charge and discharge reaction occurs preferentially in positive electrode active material particles on the current collector side adjacent to the positive electrode active material particles having a decreased capacity due to the uneven intralayer reaction. Therefore, even in a case where the number of times of repeated charging and discharging is small, the capacity of the positive electrode active material particles decreases. As a result, as the cycle is further repeated, a phenomenon in which a decrease in the capacity of the positive electrode active material particles in the positive electrode active material layer rapidly progresses from the side facing the negative electrode to the current collector side occurs, and thus the cycle characteristics of the lithium ion secondary battery rapidly deteriorate.

Figure 2:
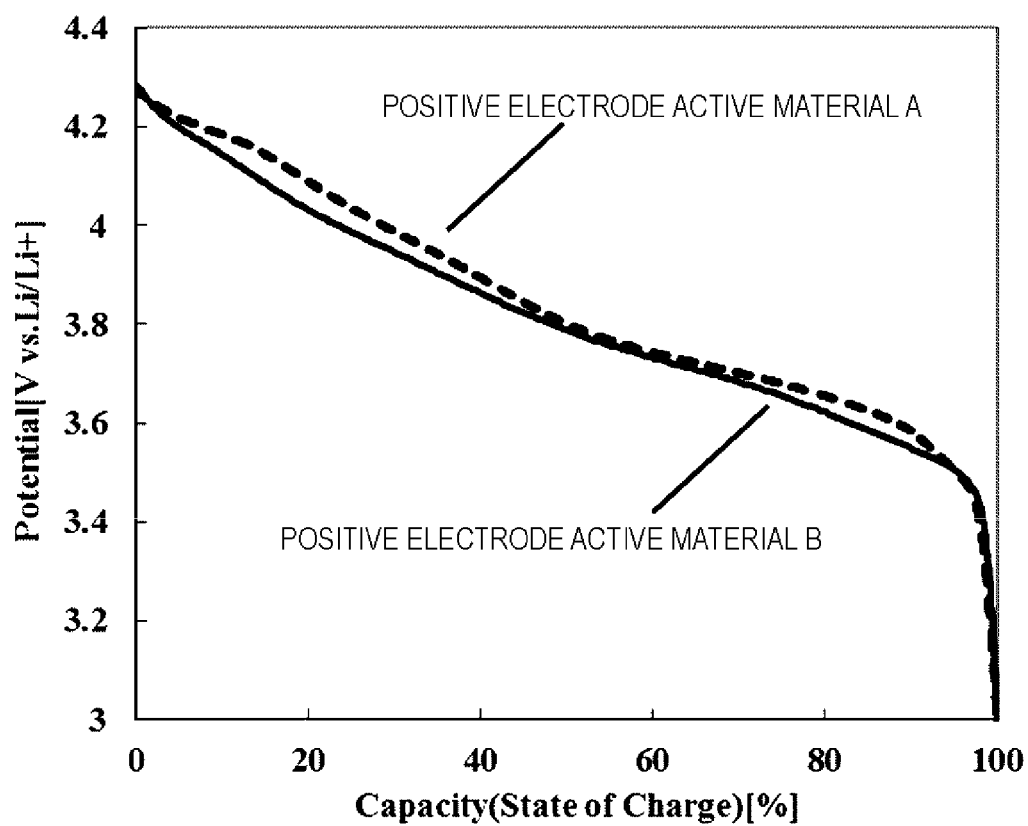
FIG. 2 is a diagram showing changes in the reaction potentials of positive electrode active material particles A and positive electrode active material particles B during charging and discharging.

The positive electrode active material particles A and the positive electrode active material particles B have substantially the same crystal structure but are different from each other in an element that is to be substituted with a part of nickel and a ratio thereof. Therefore, as shown in FIG. 2, reaction potentials of charging and discharging are slightly different from each other. In a case where the positive electrode active material particles A and the positive electrode active material particles B are present in a positive electrode active material layer, even when a charge and discharge reaction occurs in the vicinity of a surface of a positive electrode active material layer facing a negative electrode due to the uneven intralayer charge and discharge reaction, a charge and discharge reaction also occurs in positive electrode active material particles having a low reaction potential present around a current collector side. Therefore, the charge and discharge reaction of the positive electrode active material particles in the positive electrode active material layer as a whole can be made to be more even. As a result, the preferential capacity decrease of the positive electrode active material particles present on the surface of the positive electrode active material layer facing the negative electrode can be prevented, and the rapid capacity decrease in the positive electrode active material layer following the preferential capacity decrease can be suppressed.

As a result, it is presumed that a lithium ion secondary battery having a high energy density and a long lifetime can be provided by using the positive electrode active material particles A formed of a nickel composite oxide in which the ratio of Ni having a high discharge capacity exceeds 90% and the positive electrode active material B having a higher capacity than other positive electrode active materials in the positive electrode active material layer.

In addition, in a case where the positive electrode active material particles A having a lamellar crystal structure are used, the amount of lithium residues causing cracked gas to occur during charging and discharging increases. On the other hand, the positive electrode active material particles B can be manufactured while reducing a small amount of lithium residues.

By adjusting the amounts of the positive electrode active material particles A and the positive electrode active material particles B to be mixed and adjusting a mixing ratio thereof to be equal to or lower than a threshold at which cracked gas does not occur significantly, a lithium ion secondary battery in which volume expansion caused by cracked gas during charging and discharging is further reduced can be manufactured.

Regarding the mixing ratio between the positive electrode active material particles A and the positive electrode active material particles B, in a case where the total amount of the positive electrode active material particles A and the positive electrode active material particles B is represented by 100 parts by mass, it is preferable that the mixing amount of the positive electrode active material particles A is equal to or more than 3 parts by mass and equal to or less than 97 parts by mass and the mixing amount of the positive electrode active material particles B is equal to or more than 3 parts by mass and equal to or less than 97 parts by mass from the viewpoint of further improving lifetime characteristics, it is more preferable that the mixing amount of the positive electrode active material particles A is equal to or more than 40 parts by mass and equal to or less than 97 parts by mass and the mixing amount of the positive electrode active material particles B is equal to or more than 3 parts by mass and equal to or less than 60 parts by mass from the viewpoint of further improving a balance between lifetime characteristics and energy density, and it is still more preferable that the mixing amount of the positive electrode active material particles A is equal to or more than 70 parts by mass and equal to or less than 97 parts by mass and the mixing amount of the positive electrode active material particles B is equal to or more than 3 parts by mass and equal to or less than 30 parts by mass.

In the positive electrode active material particles A represented by Formula (A): $Li_\alpha Ni_x Co_y M^1_{(1-x-y)} O_2$ (where $0<\alpha \leq 1.15$, $0.90<x \leq 0.98$, $0<y \leq 0.10$, and $0<(1-x-y)$), $\alpha$ is preferably equal to or more than 0.80 and equal to or less than 1.10 and more preferably equal to or more than 0.95 and equal to or less than 1.05, x is preferably more than 0.90 and 0.95 or less and more preferably more than 0.90 and 0.93 or less, and y is preferably equal to or more than 0.01 and equal to or less than 0.10, more preferably equal to or more than 0.02 and equal to or less than 0.08, and still more preferably equal to or more than 0.03 and equal to or less than 0.07.

In the positive electrode active material particles B represented by Formula (B): $Li_\beta Ni_a Co_b M^2_{(1-a-b)} O_2$ (where $0<\beta \leq 1.15$, $0.70 \leq a \leq 0.90$, $0<b \leq 0.20$, and $0<(1-a-b)$), $\beta$ is preferably equal to or more than 0.80 and equal to or less than 1.10 and more preferably equal to or more than 0.95 and equal to or less than 1.05, a is preferably equal to or more than 0.75 and equal to or less than 0.85, and b is preferably equal to or more than 0.05 and equal to or less than 0.20 and more preferably equal to or more than 0.10 and equal to or less than 0.18.

$M^1$ and $M^2$ each independently represent one element or two or more elements selected from the group consisting of Li, B, Mg, Al, Fe, and Mn, preferably at least one selected from the group consisting of Al and Mn, and more preferably Al.

A method of manufacturing the positive electrode active material particles A or the positive electrode active material particles B is not particularly limited, and the positive electrode active material particles A or the positive electrode active material particles B can be manufactured using a generally well-known method. For example, the positive electrode active material particles A or the positive electrode active material particles B can be manufactured using a method described in Japanese Patent No. 3614670.

<Positive Electrode>

A positive electrode according to the embodiment includes a positive electrode active material layer that includes the positive electrode active material according to the embodiment and optionally further includes a binder and a conductive assistant.

In addition, the positive electrode according to the embodiment includes, for example, a current collector and the positive electrode active material layer that is provided on the current collector.

The positive electrode active material layer according to the embodiment includes the positive electrode active material according to the embodiment.

The positive electrode active material layer according to the embodiment may include another positive electrode active material. From the viewpoint of energy density, in a case where the total content of the positive electrode active material layer is represented by 100 mass %, the total content of the positive electrode active material particles A and the positive electrode active material particles B in the positive electrode active material layer is preferably 50 mass % or higher, more preferably 75 mass % or higher, still more preferably 85 mass % or higher, still more preferably 90 mass % or higher, and still more preferably 95 mass % or higher. The upper limit of the total content of the positive electrode active material particles A and the positive electrode active material particles B in the positive electrode active material layer is not particularly limited and is, for example, 100 mass % or lower.

The thickness of the positive electrode active material layer is not particularly limited and can be appropriately adjusted according to desired characteristics. For example, the thickness can be set to be large from the viewpoint of energy density and can be set to be small from the viewpoint of output characteristics. The thickness of the positive electrode active material layer can be appropriately set, for example, in a range of 10 to 250 μm and is preferably 20 to 200 μm and more preferably 50 to 180 μm.

The positive electrode active material layer may optionally include a conductive assistant. The conductive assistant is not particularly limited, and a typically used conductive assistant such as carbon black, Ketjen black, acetylene black, natural graphite, artificial graphite, or carbon fiber can be used.

The positive electrode active material layer may optionally include a binder. The binder is not particularly limited. For example, in a case where N-methyl-pyrrolidone (NMP) is used as a solvent, a typically used binder such as polytetrafluoroethylene (PTFE) or polyvinylidene fluoride (PVDF) can be used. In a case where water is used as a solvent, a typically used binder such as a styrene-butadiene rubber can be used. Further, a typically used binder as a thickener such as carboxymethyl cellulose, methyl cellulose, or hydroxymethyl cellulose can be used.

In a case where the total content of the positive electrode active material layer is represented by 100 mass %, the content of the conductive assistant in the positive electrode active material layer is preferably 0.1 to 10 mass % and more preferably 1 to 10 mass %.

In a case where the total content of the positive electrode active material layer is represented by 100 mass %, the content of the binder in the positive electrode active material layer is preferably 0.1 to 10 mass % and more preferably 1 to 10 mass %.

In a case where the proportions of the conductive assistant and the binder are equal to or lower than the upper limit values, the proportion of the positive electrode active material for a lithium ion secondary battery increases, and the capacity per weight increases, which is preferable. In a case where the proportions of the conductive assistant and the binder are equal to or higher than the lower limit values, the conductivity is further improved, and electrode peeling is suppressed, which is preferable.

In addition, the density of the positive electrode active material layer is preferably 2.55 to 3.45 g/cm$^3$. In a case where the density of the positive electrode active material layer is in the range, the discharge capacity during use at a high discharge rate is improved, which is preferable.

As the positive electrode current collector, for example, aluminum, stainless steel, nickel, titanium, or an alloy thereof can be used, and examples of the positive electrode current collector include a foil, a plate, and a mesh shape. In particular, aluminum foil can be preferably used.

<Lithium Ion Secondary Battery>

Next, a lithium ion secondary battery 10 according to the embodiment will be described. FIG. 1 is a cross-sectional view showing an example (laminate type) of a structure of the lithium ion secondary battery 10 according to the embodiment of the present invention. As shown in FIG. 1, the lithium ion secondary battery 10 according to the embodiment includes at least a negative electrode capable of storing and releasing lithium, an electrolytic solution, and the positive electrode according to the embodiment. In addition, a separator 5 can be provided between the positive electrode and the negative electrode. Plural electrode pairs of the positive electrodes and the negative electrodes can be provided.

For example, the lithium ion secondary battery 10 includes: a positive electrode including a positive electrode current collector 3 that is formed of a metal such as aluminum foil and a positive electrode active material layer 1 that is provided on the positive electrode current collector 3 and includes a positive electrode active material; and a negative electrode including a negative electrode current collector 4 that is formed of a metal such as copper foil and a negative electrode active material layer 2 that is provided on the negative electrode current collector 4 and includes a negative electrode active material. The positive electrode and the negative electrode are laminated with the separator 5 formed of nonwoven fabric or a polypropylene microporous membrane interposed therebetween such that, for example, the positive electrode active material layer 1 and the negative electrode active material layer 2 face each other. This electrode pair is accommodated in, for example, a container including exterior bodies 6 and 7 formed of an aluminum laminate film. A positive electrode tab 9 is connected to the positive electrode current collector 3, a negative electrode tab 8 is connected to the negative electrode current collector 4, and these tabs are drawn out to the outside of the container. An electrolytic solution is injected into the container and sealed therein. A structure where an electrode group in which plural electrode pairs are laminated is accommodated in the container can also be adopted. In the embodiment, the drawings are exaggerated for convenience of description, and the technical scope of the present invention is not limited to the form illustrated in the drawings.

The lithium ion secondary battery 10 according to the embodiment can be prepared using a well-known method.

As the electrode, for example, a laminate or a wound body can be used. As the exterior body, a metal exterior body or an aluminum laminate exterior body can be appropriately used. The shape of the battery may be any one of a coin shape, a button shape, a sheet shape, a cylindrical shape, a square shape, or a flat shape.

(Negative Electrode)

A negative electrode according to the embodiment includes a negative electrode active material layer that includes a negative electrode active material and optionally further includes a binder and a conductive assistant.

In addition, the negative electrode according to the embodiment includes, for example, a current collector and the negative electrode active material layer that is provided on the current collector.

As the negative electrode active material according to the embodiment, a material capable of storing and releasing lithium, for example, a lithium metal, a carbon material, or a Si material can be used. Examples of the carbon material include graphite, amorphous carbon, diamond-like carbon, fullerene, carbon nanotube, and carbon nanohorn that store lithium. As the Si material, for example, Si, SiO2, SiOx ($0<x\leq2$), or a Si-containing composite material can be used. In addition, a composite material including two or more selected from the above materials may be used. In a case where a lithium metal is used as the negative electrode active material, the negative electrode can be formed using an appropriate method such as a melt cooling method, a liquid quenching method, an atomizing method, a vacuum deposition method, a sputtering method, a plasma CVD method, an optical CVD method, a thermal CVD method, or a sol-gel method. In addition, in a case where a carbon material is used as the negative electrode active material, the negative electrode can be formed using, for example, a method of mixing carbon with a binder such as polyvinylidene fluoride (PVDF), dispersing and kneading the mixture in a solvent such as NMP or the like, and applying the obtained solution to the negative electrode current collector or a method such as a vapor deposition method, a CVD method, or a sputtering method.

The average particle size of the negative electrode active material is preferably 1 μm or more, more preferably 2 μm or more, and still more preferably 5 μm or more from the viewpoint of suppressing a side reaction during charging and discharging to suppress a decrease in charge and discharge efficiency and is preferably 80 μm or less and more preferably 40 μm or less from the viewpoints of input and output characteristics and electrode preparation (for example, the smoothness of an electrode surface). Here, the average particle size refers to a particle size (median size: D50) corresponding to a cumulative value of 50% in a particle size distribution (by volume) obtained using a laser scattering method.

The negative electrode active material layer may optionally include a conductive assistant or a binder. As the conductive assistant or the binder, the same conductive assistant or the same binder that can used in the positive electrode active material layer can be used.

As the negative electrode current collector, copper, stainless steel, nickel, titanium, or an alloy thereof can be used.

(Electrolytic Solution)

As the electrolytic solution, one kind or a mixture of two or more kinds selected from the following organic solvents can be used, the organic solvents including: a cyclic carbonate such as ethylene carbonate (EC), propylene carbonate (PC), vinylene carbonate (VC), or butylene carbonate (BC); a chain carbonate such as ethyl methyl carbonate (EMC), diethyl carbonate (DEC), dimethyl carbonate (DMC), or dipropyl carbonate (DPC); an aliphatic carboxylic acid ester; a γ-lactone such as γ-butyrolactone; a chain ether; and a cyclic ether. Further, a lithium salt can be dissolved in these organic solvents.

The separator is mainly formed of a porous membrane formed of a resin, woven fabric, nonwoven fabric, or the like. As the resin component, for example, a polyolefin resin such as polypropylene or polyethylene, a polyester resin, an acrylic resin, a styrene resin, or a nylon resin can be used. In particular, a polyolefin microporous membrane is preferable because it is superior in ion permeability and performance of physically separating the positive electrode and the negative electrode from each other. In addition, optionally, a layer including inorganic particles may be formed in the separator, and examples of the inorganic particles include an oxide, a nitride, a sulfide, and a carbide that have insulating properties. In particular, it is preferable that the layer include $TiO_2$ or $Al_2O_3$.

As the exterior container, a case or a can case formed of a flexible film can be used. From the viewpoint of reducing the weight of the battery, it is possible to use a flexible film. As the flexible film, a film in which a resin layer is provided on front and back surfaces of a metal layer as a substrate can be used. As the metal layer, a layer having barrier properties of preventing leakage of the electrolytic solution, permeation of moisture from the outside of the container, and the like can be selected. For example, aluminum, stainless steel, or the like can be used. For example, a heat-fusible resin layer such as a modified polyolefin is provided on at least one surface of the metal layer. The exterior container is formed by disposing the heat-fusible resin layers of the flexible films to face each other and heat-fusing the periphery around a portion that accommodates the electrode laminate. A resin layer such as a nylon film or a polyester film can be provided on a surface of the exterior body that is a surface opposite to a surface where the heat-fusible resin layer is formed.

As an apparatus for forming the active material layer on the current collector during the manufacturing of the electrode, an apparatus that performs various coating methods such as a doctor blade, a die coater, a gravure coater, a transfer method, or a vapor deposition method or a combination of the coating apparatuses can be used.

In the embodiment, it is particularly preferable to use a die coater in order to accurately form a coating end portion of the active material. Coating methods of the active material using a die coater are roughly classified into two types including: a continuous coating method of continuously forming the active material along a longitudinal direction of the elongated current collector; and an intermittent coating method of alternately forming a coating portion and a non-coating portion of the active material along the longitudinal direction of the current collector. These methods can be appropriately selected.

Hereinabove, the embodiment of the present invention has been described with reference to the drawings. However, the embodiment is an example of the present invention, and various configurations other than the embodiment can be adopted.

EXAMPLES

Hereinafter, the present invention will be described using Examples and Comparative Examples described below. The present invention is not limited to Examples described below.

Examples 1 to 8 and Comparative Examples 1 and 2

As the positive electrode active material particles A, a nickel composite oxide ($LiNi_{0.92}Co_{0.05}Al_{0.03}O_2$) having a lamellar crystal structure with an average particle size of 13.4 μm and a BET specific surface area of 0.25 m$^2$/g was prepared. As the positive electrode active material particles B, a nickel composite oxide ($LiNi_{0.80}Co_{0.15}Al_{0.05}O_2$) having a lamellar crystal structure with an average particle size of 6.5 μm and a BET specific surface area of 0.45 m$^2$/g was prepared. These positive electrode active material particles and carbon black as a conductive assistant were mixed with each other through a dry process. The obtained mixture was uniformly dispersed in N-methyl-2-pyrrolidone (NMP) in which a polyvinylidene fluoride resin (PVDF) as a binder was dissolved. As a result, a slurry A was prepared. A solid content ratio in the slurry A was positive electrode active material particles A:positive electrode active material particles B:conductive assistant:PVDF=89.24:2.76:4:4 (mass %). At this time, a mass ratio between the positive electrode active material particles A and the positive electrode active material particles B was 97:3.

The slurry A was applied to aluminum metal foil (thickness: 20 μm) as a positive electrode current collector, and NMP was evaporated. As a result, a positive electrode active material layer (thickness: 85 μm) including the positive electrode active material particles A and the positive electrode active material particles B was formed on the aluminum metal foil, and thus a positive electrode sheet according to Example 1 was prepared.

In addition, positive electrode sheets according to Examples 2 to 8 and Comparative Examples 1 and 2 shown in Table 1 were prepared using the same method as that of Example 1, except that a mixing ratio between the positive electrode active material particles A and the positive electrode active material particles B was changed to a value (mass ratio) shown in Table 1.

(Evaluation)

As a negative electrode active material, natural graphite was used. Natural graphite and PVDF were mixed at a ratio of natural graphite:PVDF=90:10 (mass %), the mixture was dispersed in NMP, the obtained solution was applied to copper foil (thickness: 10 μm) as the negative electrode current collector 4. As a result, a negative electrode sheet was prepared. As an electrolytic solution, a nonaqueous electrolytic solution in which 1 mol/L of $LiPF_6$ as an electrolyte was dissolved was used. Next, the negative electrode sheet and the positive electrode sheet were laminated with the separator 5 formed of polyethylene interposed therebetween. As a result, a laminate type secondary battery was prepared.

Using the laminate type secondary battery prepared using the method described above, high-temperature cycle characteristics were evaluated. At a temperature of 45° C., the charge rate was 1.0 C, the discharge rate was 1.0 C, the charging end voltage was 4.2 V, and the discharging end voltage was 2.5 V. The capacity retention (%) is a value obtained by dividing the discharge capacity (mAh) after 500 cycles by the discharge capacity (mAh) after 10 cycles. The discharge capacity (mAh/g) shown in Table 1 is a value obtained by dividing the capacity (Ah) of the laminate type secondary battery during the first cycle by the weight (g) of the positive electrode active material. Table 1 collectively shows the obtained values of the capacity retention and the discharge capacity.

TABLE 1

|  | Active Material A:Active Material B | Capacity Retention (%) | Discharge Capacity (mAh/g) |
|---|---|---|---|
| Example1 | 97:3 | 78.3 | 219.1 |
| Example2 | 90:10 | 81.1 | 217 |
| Example3 | 75:25 | 83.4 | 212.5 |
| Example4 | 60:40 | 85.5 | 208 |
| Example5 | 50:50 | 86.9 | 205 |
| Example6 | 40:60 | 87.2 | 202 |
| Example7 | 10:90 | 85.6 | 193 |
| Example8 | 3:97 | 84.5 | 190.9 |
| Comparative Example1 | 100:0 | 82.3 | 190 |
| Comparative Example2 | 0:100 | 70.5 | 220 |

It can be seen from a comparison between the capacity retention values of Examples and Comparative Examples that the lithium ion secondary battery in which the positive electrode active material according to each of Examples was used had a better balance between the discharge capacity and the capacity retention than the lithium ion secondary battery in which the positive electrode active material according to each of Comparative Examples was used. Accordingly, it can be understood that the positive electrode active material according to the embodiment can contribute to improvement of long-term lifetime characteristics of a lithium ion secondary battery.

The invention claimed is:

1. A positive electrode active material that is used for a positive electrode for a lithium ion secondary battery, the positive electrode active material comprising:

positive electrode active material particles A represented by Formula (A): $Li_\alpha Ni_x Co_y M^1_{(1-x-y)}O_2$ (where $0<\alpha\leq1.15$, $0.90<x\leq0.98$, $0<y\leq0.10$, and $0<(1-x-y)$); and positive electrode active material particles B represented by Formula (B): $Li_\beta Ni_a Co_b M^2_{(1-a-b)}O_2$ (where $0<\beta\leq1.15$, $0.70<a\leq0.90$, $0<b\leq0.20$, and $0<(1-a-b)$), wherein $M^1$ and $M^2$ each independently represent one element or two or more elements selected from the group consisting of Li, B, Mg, Al, Fe, and Mn, and wherein in a case where a total amount of the positive electrode active material particles A and the positive electrode active material particles B is represented by 100 parts by mass, a mixing amount of the positive electrode active material particles A is equal to or more than 40 parts by mass and equal to or less than 97 parts by mass; and a mixing amount of the positive electrode active material particles B is equal to or more than 3 parts by mass and equal to or less than 60 parts by mass.

2. The positive electrode active material according to claim 1, wherein the positive electrode active material particles A and the positive electrode active material particles B have a lamellar crystal structure.

3. A positive electrode comprising:

a positive electrode active material layer that includes the positive electrode active material according to claim 1, a binder, and a conductive assistant.

4. A lithium ion secondary battery comprising at least:

a negative electrode capable of storing or releasing lithium;

an electrolytic solution; and the positive electrode according to claim 3.

* * * * *